(12) United States Patent
Becker et al.

(10) Patent No.: US 10,595,454 B2
(45) Date of Patent: Mar. 24, 2020

(54) RAIL ROLLER PIN GANG ADJUSTMENT SYSTEM

(71) Applicant: Deere & Company, Moline, IL (US)

(72) Inventors: Shawn J. Becker, Centralia, KS (US); Jarrod R. Ruckle, Bondurant, IA (US); David L. Steinlage, Centralia, KS (US); Mark D. Beeck, Ankeny, IA (US); Andrew J. Peterson, Ankeny, IA (US); Greg T. Buse, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 83 days.

(21) Appl. No.: 15/909,467

(22) Filed: Mar. 1, 2018

(65) Prior Publication Data

US 2019/0269064 A1 Sep. 5, 2019

(51) Int. Cl.
*A01B 63/24* (2006.01)
*A01B 21/08* (2006.01)
*A01B 5/04* (2006.01)
*A01B 71/02* (2006.01)

(52) U.S. Cl.
CPC .............. *A01B 63/245* (2013.01); *A01B 5/04* (2013.01); *A01B 21/08* (2013.01); *A01B 71/02* (2013.01)

(58) Field of Classification Search
CPC ......... A01B 63/245; A01B 5/04; A01B 21/08; A01B 71/02
See application file for complete search history.

(56) References Cited

U.S. PATENT DOCUMENTS

| 1,329,598 | A | * | 2/1920 | Hegland | A01B 21/08 172/479 |
|---|---|---|---|---|---|
| 1,790,331 | A | * | 1/1931 | Strandlund | A01B 39/08 172/287 |
| 1,832,021 | A | * | 11/1931 | Hand | A01B 23/046 172/600 |
| 2,036,598 | A | * | 4/1936 | Miller et al. | E01C 23/121 172/252 |
| 2,798,420 | A | * | 7/1957 | Ewalt | A01B 15/16 172/600 |
| 5,462,123 | A | | 10/1995 | Harlan et al. | |

OTHER PUBLICATIONS

Kuhn Krause, "Excelerator 8000-25 Vertical Tillage," website article (downloaded from Internet site Mar. 22, 2018) http://www.kuhnnorthamerica.com/us/range/tillage-tools/vertical-tillage/excelerator-8000-25.html, 2 pages.
Kuhn Krause, "Excelerator 8005 Vertical Tillage—Accelerate Residue Breakdown," brochure (2016) http://www.kuhnnorthamerica.com, 8 pages.

(Continued)

*Primary Examiner* — Tara Mayo-Pinnock
(74) *Attorney, Agent, or Firm* — Michael Best & Friedrich LLP

(57) ABSTRACT

A tillage machine includes a main frame, a gang rotatably coupled to the main frame, and an arcuately-shaped adjustment rail coupled to the main frame. At least a portion of the adjustment rail is spaced from the main frame. The adjustment rail includes a plurality of apertures each configured to receive a locking structure, and the adjustment rail defines an open space adjacent the main frame.

19 Claims, 4 Drawing Sheets

(56) References Cited

OTHER PUBLICATIONS

Kuhn Krause, "New Kuhn Krause Excelerator 8005 Vertical Tillage System," website article (Aug. 11, 2016) Capital Press, http://www.capitalpress.com/Advertising/Press_Releases/20160811/new-kuhn-krause-excelerator-8005-v, 2 pages.

Kongskilde, "Vertical Tillage 9000 series," website article (first known to us and downloaded from Internet site Mar. 22, 2018) http://www.kongskilde.com/Agriculture/Soil/Vertical%20Tillage/Vertical%20Tillage/VERTICAL%20TILLAGE, 4 pages.

Kongskilde, "9200 DF Vertical Tillage—Double Fold," operators manual (Dec. 2015) 760000257—Revision 1 Serial No. 500011—current, pp. 1-23.

* cited by examiner

RAIL ROLLER PIN GANG ADJUSTMENT SYSTEM

BACKGROUND

The present disclosure relates to tillage machines, and specifically to gang angle adjustment on tillage machines.

Tillage machines commonly include a gang. The gang includes a gang support element (e.g., elongate tube, arm, frame member, etc.), and a set of blades that are rotatably coupled to the gang support element and are aligned parallel to one another along a common axis of rotation. The blades dig into soil as the gang is being pulled behind a tractor or other vehicle. In some machines, the gang may be adjusted angularly relative to a main frame of the tillage machine, between a shallow gang angle and a more aggressive gang angle. When the gang is adjusted to a shallow gang angle, the axis of rotation of the blades is generally aligned perpendicular (or close to perpendicular) to the direction of forward movement of the tractor, thus creating relatively narrow seedbeds. In contrast, with a more aggressive gang angle, the blades create wider seedbeds because of the larger angle at which the blades engage the soil.

SUMMARY

In one aspect, the disclosure provides a tillage machine having a main frame, a gang rotatably coupled to the main frame, and an arcuately-shaped adjustment rail coupled to the main frame. At least a portion of the adjustment rail is spaced from the main frame. The adjustment rail includes a plurality of apertures each configured to receive a locking structure, and the adjustment rail defines an open space adjacent the main frame.

In another aspect, the disclosure provides a gang for a tillage machine, the gang having a gang support element, a plurality of blades rotatably coupled to the gang support element, and a bracket extending from the gang support element. The bracket includes a main plate having an aperture. The gang further includes a roller coupled to the main plate, and a locking structure coupled to the main plate. The locking structure includes a pin configured to extend through the aperture.

In another aspect, the disclosure provides a tillage machine having a main frame, and an arcuately-shaped adjustment rail coupled to the main frame. The adjustment rail includes a plurality of apertures and an upper surface. The tillage machine also includes a gang coupled to the main frame about a pivot point. The gang includes a gang support element, a plurality of blades rotatably coupled to the gang support element, and a roller coupled to the gang support element and in contact with the upper surface.

Other aspects of the disclosure will become apparent by consideration of the detailed description and accompanying drawings.

DETAILED DESCRIPTION

Figure 1:
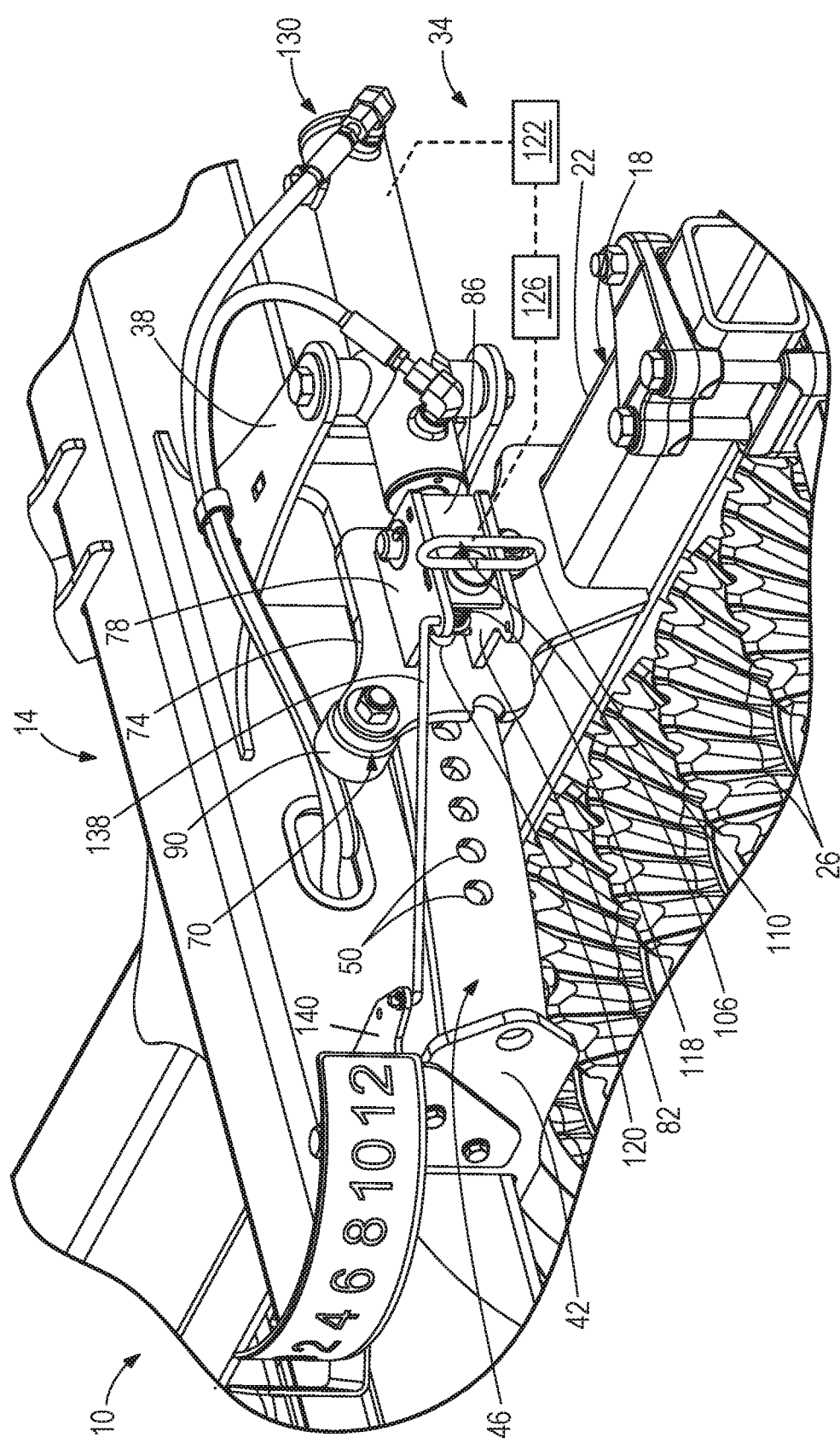
FIG. 1 is a partial perspective view of a tillage machine, illustrating a gang adjustment system.

Before constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

FIGS. 1-4 illustrate a tillage machine 10. The tillage machine 10 includes a main frame 14 and a gang 18 coupled to the main frame 14. The gang 18 includes a gang support element 22 (e.g., elongate tube, arm, frame member, etc.), and a set of blades 26 coupled to the gang support element 22. The blades 26 each rotate about a common axis of rotation 30 (FIG. 3), and are used for example to dig into soil to create seedbeds as the tillage machine 10 is pulled with a tractor or other vehicle.

Figure 2:
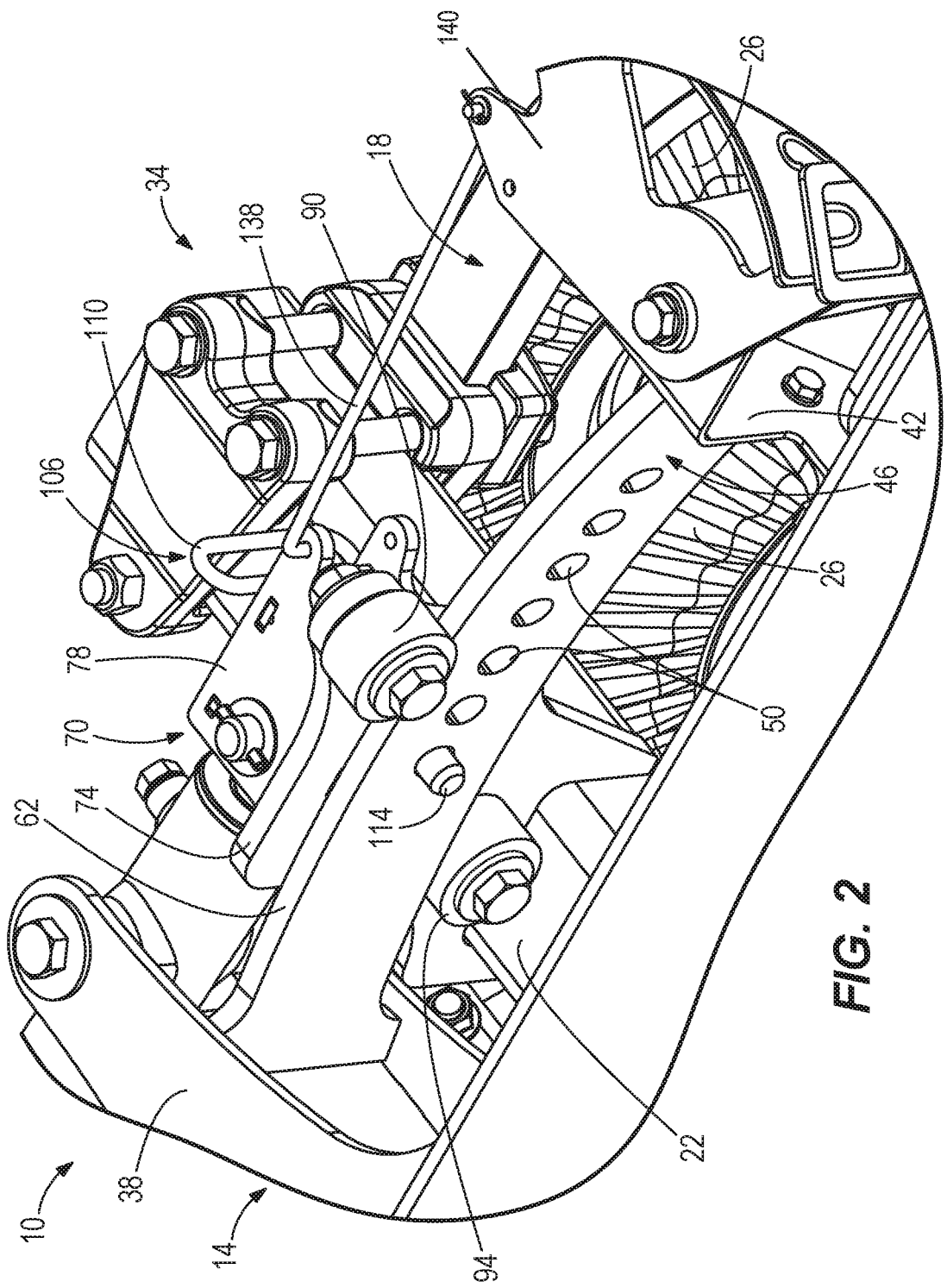
FIG. 2 is a further perspective view of the gang adjustment system of FIG. 1.
Figure 3:
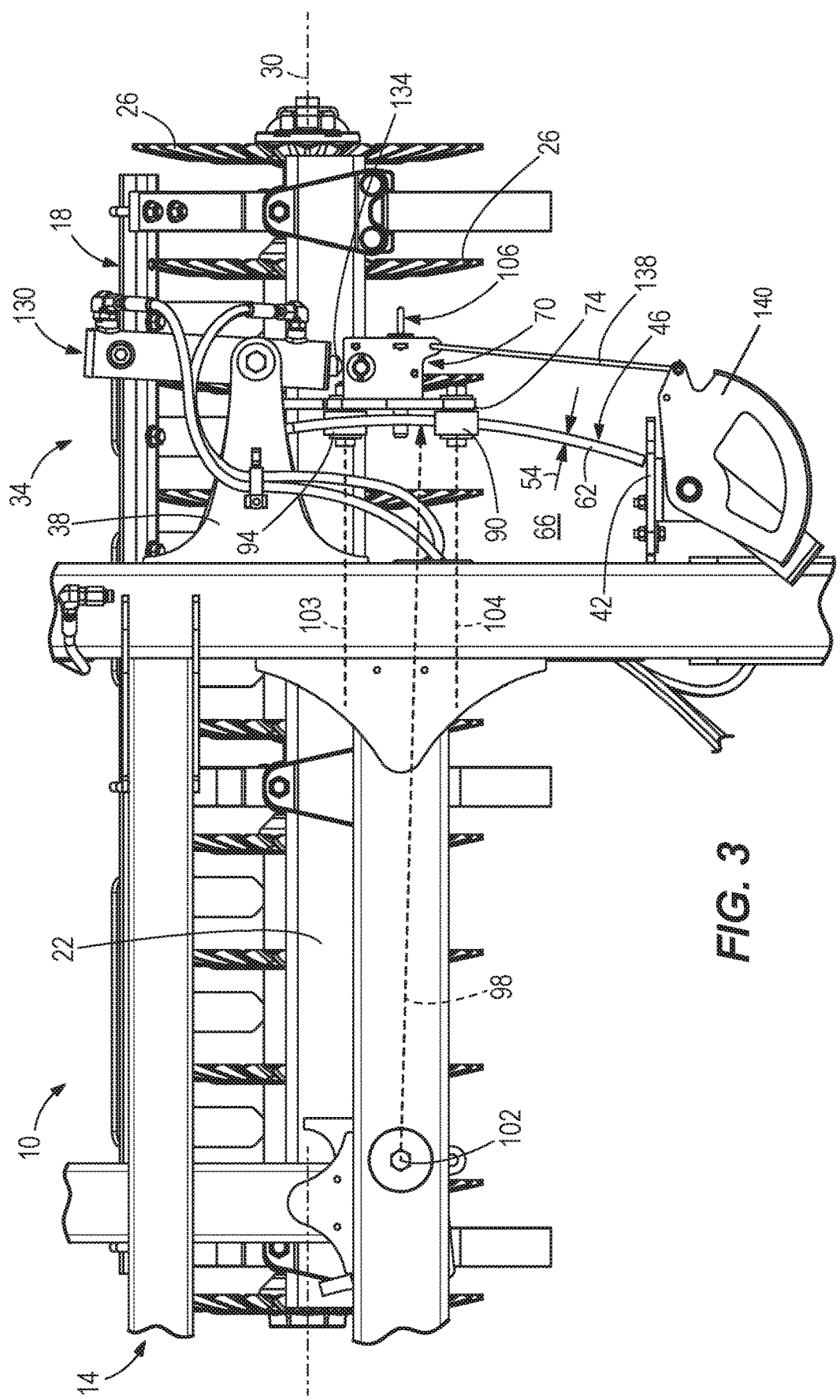
FIG. 3 is a top view of the gang adjustment system of FIG. 1.
Figure 4:
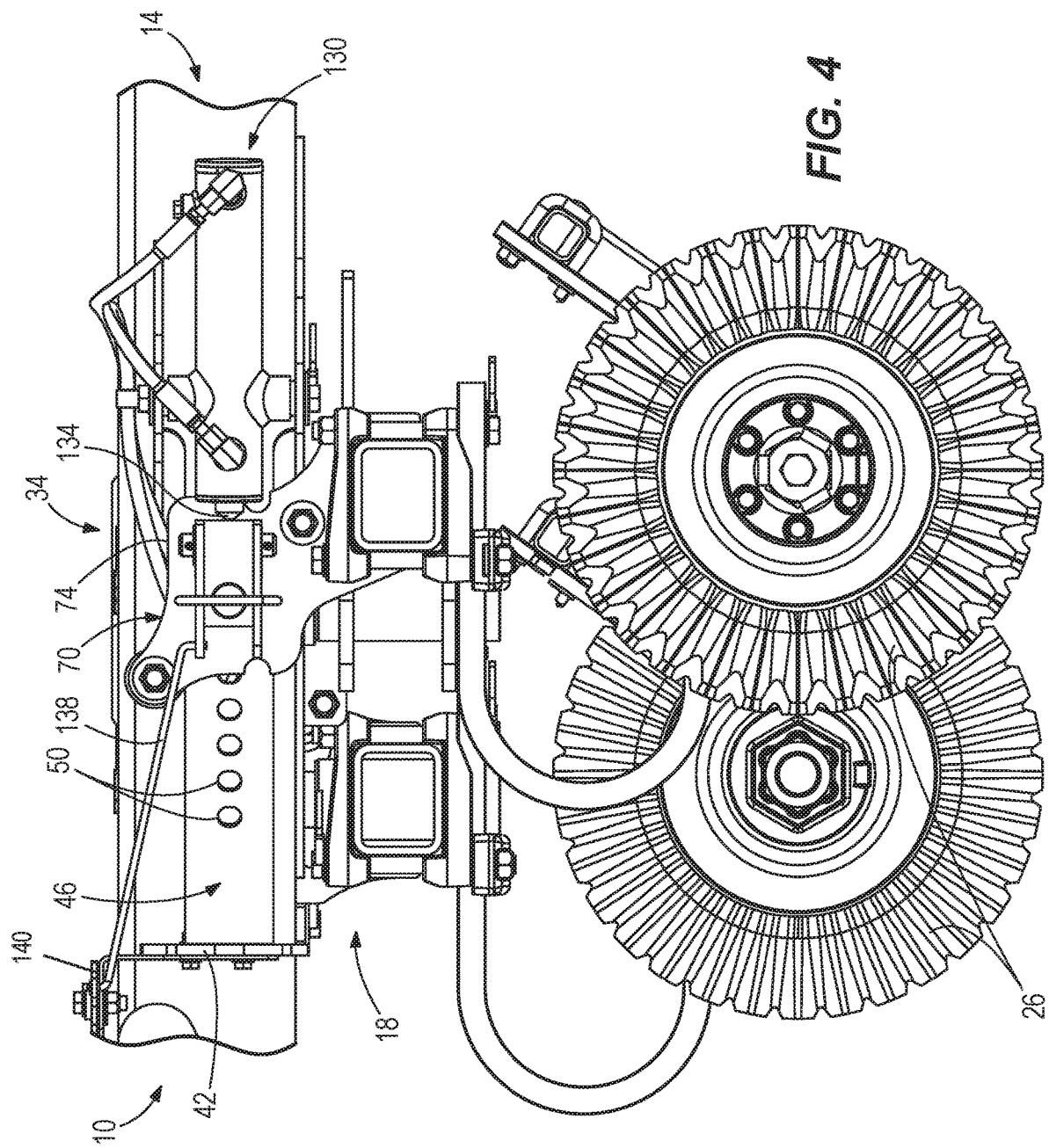
FIG. 4 is a further perspective view of the gang adjustment system of FIG. 1.

With continued reference to FIGS. 1-4, the tillage machine 10 includes a gang adjustment system 34 that may be used to adjust an angle of the gang 18 relative to the main frame 14. The gang adjustment system 34 includes a first bracket 38 coupled (e.g., welded, attached via fasteners, etc.) to the main frame 14, a second bracket 42 coupled to the main frame 14 (e.g., extending parallel to the first bracket 38), and an adjustment rail 46 coupled to and extending between the first and second brackets 38, 42. In some constructions, the first bracket 38, the second bracket 42, and/or the adjustment rail 46 are integrally formed as a single piece with the main frame 14. As illustrated in FIGS. 1, 2, and 4, the adjustment rail 46 includes a plurality of apertures 50. The apertures 50 are equally spaced along the adjustment rail 46, and are equally sized and shaped to receive a locking pin or other locking structure. Other constructions include different numbers, spacing, and/or size of apertures 50 than that shown.

As illustrated in FIG. 3, the adjustment rail 46 has an arcuate shape, although other constructions may include different shapes than that illustrated (e.g., linear). With continued reference to FIG. 3, the adjustment rail 46 also has a thickness 54 (e.g., a constant thickness along the entire or substantially the entire adjustment rail 46, or at least along a portion of the adjustment rail 46 that includes the apertures 50) that is significantly smaller than the arcuate length of the adjustment rail 46. Thus, when viewed directly from above as in FIG. 3 (i.e., looking directly down toward a level ground or field) there is very little surface area on an upper surface 62 of the adjustment rail 46 for accumulation of dirt, debris, or other material. In some constructions, the thickness 54 is less than three inches, less than two inches, less than one inch, less than 0.75 inch, less than 0.5 inch, or less than 0.25 inch. Other constructions include various other ranges and values. With continued reference to FIG. 3, the first bracket 38, the second bracket 42, and the adjustment rail 46 also define an open space or gap region 66 adjacent the main frame 14, such that dirt, debris, or other material may fall through the space and not accumulate on top of the tillage machine 10.

With reference to FIGS. 1-4, the gang adjustment system 34 includes a third bracket 70 that is coupled (e.g., welded, attached via fasteners, etc.) to the gang support element 22, or is integrally formed as a single piece with the gang support element 22. As illustrated in FIG. 1, in the illustrated construction the third bracket 70 extends generally perpendicularly (e.g., upwardly) from the gang support element 22, and includes a main plate 74, a first plate 78 that extends (e.g., perpendicularly) from the main plate 74, a second plate 82 that extends (e.g., perpendicularly) from the main plate 74, and a third plate 86 that extends between the first and second plates 78, 82 and is spaced from (e.g., in a parallel relationship thereto) the main plate 74. As illustrated in FIG. 3, the main plate 74 is positioned adjacent to (e.g., spaced slightly from) the adjustment rail 46. The main plate 74 is configured to move alongside the adjustment rail 46 as the gang 18 is adjusted. Other constructions include different numbers and arrangements of plates, as well as other shapes, sizes, and dimensions of plates than that illustrated for the third bracket 70.

With reference to FIGS. 1-4, at least one rolling or slide element is provided. The term "rolling or slide element" as used herein denotes any type of roller, bearing, bushing (e.g., on heat treated pin), or other structure and/or surface that facilitates a rolling or sliding movement of the gang 18 along or relative to the adjustment rail 46. In the illustrated construction, the rolling or sliding element is in the form of a first roller 90 coupled to the main plate 74 along one corner region of the main plate 74 and in contact with the upper surface 62 of the adjustment rail 46, and a second roller 94 coupled to the main plate 74 along an opposite corner region of the main plate 74 and in contact with a lower surface (not shown) of the adjustment rail 46. In other constructions, only a single roller is provided (e.g., the first roller 90). In yet other constructions, more than two rollers are provided (e.g., four rollers, two contacting the upper surface 62 and two contacting the lower surface of the adjustment rail 46). In some constructions, the adjustment rail 46 itself additionally or alternatively includes one or more rollers or other rolling or slide elements (e.g., on the upper surface 62) that facilitate the rolling or sliding movement.

With reference to FIG. 3, the adjustment rail 46 extends along a radius of curvature 98 that extends from a pivot point 102 (e.g., pivot pin) on the main frame 14. When the gang 18 is adjusted relative to the main frame 14, the gang 18 rotates about the pivot point 102. As the gang 18 is rotated, the first and second rollers 90, 94 slide along the adjustment rail 46. In the illustrated construction the first roller 90 and the second roller 94 have axes of rotation 103, 104, respectively, that are parallel to one another and extend perpendicular to the main plate 74. In other constructions, one or more of the roller or rollers 90, 94 may have an axis of rotation that is inclined at an oblique angle relative to the main plate 74 to facilitate or optimize ease of rolling, and/or provide a different contact with the upper surface 62 than that illustrated. For example, in some constructions the first axis 103 and the second axis 104 extend from the main plate 74 and intersect at the pivot point 102.

With reference to FIGS. 1 and 2, the gang adjustment system 34 further includes a locking structure 106 that is used to lock a position of the gang 18 relative to the main frame 14. In the illustrated construction the locking structure 106 is a pin. The pin is spring-loaded, and includes a handle 110 that may be gripped by a user, a main pin body 114 (FIG. 3), and a biasing element (e.g., spring coil) 118 (FIG. 1) disposed between the third plate 86 and the main plate 74 that biases the main pin body 114 toward the adjustment rail 46. As illustrated in FIGS. 1 and 2, the main pin body 114 extends (e.g., horizontally and/or along an axis parallel to axes 103, 104) through an aperture (not visible) in the third plate 86, an aperture 120 in the main plate 74, and through one of the apertures 50 along the adjustment rail 46 (FIG. 2) to lock the rotational position of the gang 18. Other constructions include a locking structure 106 in the form of a bolt, screw, and/or a non-biased structure, that may be selectively moved into and out of the apertures 50 in the adjustment rail 46 to lock the position of the gang 18.

With reference to FIG. 1, while the illustrated construction includes a locking structure 106 that is adjusted manually via hand, in other constructions the locking structure 106 is moved via a controller 122 and a first actuator 126 (e.g., linear actuator, solenoid, etc.). The controller 122 may be operated manually from a cab of a tractor or other vehicle pulling the tillage machine 10, or may be programmed or configured to automatically move the locking structure 106.

In some constructions, and with continued reference to FIG. 1, the locking structure 106 may be locked out. For example, the locking structure 106 may be retracted by the first actuator 126 and held in the retracted position by the first actuator 126. Alternatively, the locking structure 106 may be pulled back manually (e.g., via pulling on the handle 110 and then turned or twisted so that the main pin body 114 can no longer pass into the apertures 50). In some constructions, the main pin body 114 may be shaped (e.g., oval-shaped, etc.) such that when the locking structure 106 is twisted, the main pin body 114 can no longer pass through the aperture 120 in the main plate 74, and thus instead abuts against the main plate 74. When the locking structure 106 is locked out, a second actuator 130 (e.g., linear actuator) may then be used to adjust an angle of the gang 18. In the illustrated construction, the second actuator 130 is a hydraulic cylinder, and is coupled to the first bracket 38. The hydraulic cylinder includes a cylinder rod 134 (FIGS. 3 and 4) that extends linearly and presses against the third bracket 70 (e.g., against a further, fourth plate of the third bracket 70 that extends from the main plate 74) to push the gang 18 and rotate the gang 18 about the pivot point 102. In some constructions the cylinder rod 134 is fixed to the third bracket 70, so that the gang 18 may be pushed and/or pulled by the cylinder rod 134 and second actuator 130. In some of these constructions the locking structure 106 may be omitted entirely, as the second actuator 130 itself may control the position of the gang 18 and hold a position of the gang 18. In some constructions, the second actuator 130 is rotatable about the first bracket 38 to accommodate for the movement of the gang 18. Other constructions include different types and locations for the second actuator 130 than that illustrated.

With continued reference to FIG. 1, the second actuator 130 is shown coupled to the controller 122. Thus, the controller 122 may control both the first actuator 126 and the second actuator 130. In other constructions, only one of the two actuators 126, 130 may be provided. In yet other constructions, neither the first nor the second actuator 126, 130 or the controller 122 are provided. The controller 122 may be coupled to a cab of the tractor or other vehicle so that an operator in the cab may manually operate the first and/or second actuators 126, 130. In some constructions, the controller 122 may be programmed to automatically operate and control the first and/or second actuators 126, 130.

During operation, the gang adjustment system 34 allows for easy adjustment and movement of the gang 18 relative to the main frame 14, to adjust the angles at which the blades 26 contact the soil. In some constructions, the gang 18 may be easily adjusted without the use of tools (e.g., without needing tools to remove a bolt or other structure each time the gang is adjusted). For example, in the illustrated construction, if an operator wishes to adjust the gang 18 to a different angle, the operator may simply pull on the handle 110, thereby compressing the biasing element 118 and pulling the main pin body 114 out of the aperture 50. Alternatively, the operator may send a command to the first actuator 126 to retract the main pin body 114 from the aperture 50. The gang 18 may then be rotated about the pivot point 102 to a desired position (e.g., either manually or with the second actuator 130). Once the desired position is reached, the main pin body 114 is then inserted back into a different one of the apertures 50 to lock the position of the gang 18.

With reference to FIGS. 1-4, in some constructions the adjustment system 34 further includes a gang angle indicator that provides a manner by which an operator may view a gang angle setting (e.g., from a tractor cab). For example, as illustrated in FIGS. 1-4, the gang angle indicator may include an elongate thin rod 138 and a plate 140 (e.g., with indicator marks) that are pivotally coupled to each other and/or to the second bracket 42 and the top plate 78.

Various features and advantages of the disclosure are set forth in the following claims.

What is claimed is:

1. A tillage machine comprising:
a main frame;
a gang rotatably coupled to the main frame; and
an arcuately-shaped adjustment rail coupled to the main frame, wherein at least a portion of the adjustment rail is spaced from the main frame, wherein the adjustment rail includes a plurality of apertures each configured to receive a locking structure, wherein the gang includes a roller in contact with the adjustment rail, and wherein the adjustment rail defines an open space adjacent the main frame.

2. The tillage machine of claim 1, wherein the adjustment rail has a thickness when viewed directly from above when the tillage machine is on a level ground or field, wherein the thickness is less than 3 inches.

3. The tillage machine of claim 1, wherein the gang includes a plurality of blades, wherein the gang is rotatably coupled to the main frame about a pivot point on the main frame, and wherein the adjustment rail extends along a radius of curvature that extends from the pivot point.

4. The tillage machine of claim 1, wherein a first bracket is coupled to the main frame and a second bracket is coupled to the main frame, wherein the adjustment rail extends between the first and second brackets.

5. The tillage machine of claim 4, further comprising an actuator coupled to the second bracket, wherein the actuator is a linear actuator configured to move the gang.

6. The tillage machine of claim 5, wherein the linear actuator is rotatably coupled to the second bracket.

7. The tillage machine of claim 5, wherein the gang includes a third bracket, and wherein the linear actuator is a hydraulic cylinder that includes a cylinder rod pressed against the third bracket of the gang.

8. The tillage machine of claim 1, further comprising the locking structure, wherein the locking structure is a spring-biased pin configured to lock an angular position of the gang.

9. The tillage machine of claim 8, wherein the gang includes a main plate, and wherein the locking structure is coupled to the main plate.

10. A gang for a tillage machine, the gang comprising:
a gang support element;
a plurality of blades rotatably coupled to the gang support element;
a bracket extending from the gang support element, wherein the bracket includes a main plate having an aperture;
a roller coupled to the main plate; and
a locking structure coupled to the main plate, wherein the locking structure includes a pin configured to extend through the aperture.

11. The gang of claim 10, wherein the roller is a first roller, wherein the gang includes a second roller coupled to the main plate.

12. The gang of claim 10, wherein the bracket includes a first plate extending from the main plate, a second plate extending from the main plate, and a third plate extending between the first and second plates.

13. The gang of claim 12, wherein first and second plates each extend perpendicularly from the main plate, and wherein the third plate extends parallel to the main plate.

14. The gang of claim 10, wherein the pin is a spring-biased pin.

15. A tillage machine comprising:
a main frame;
an arcuately-shaped adjustment rail coupled to the main frame, the adjustment rail including a plurality of apertures and an upper surface; and a
a gang coupled to the main frame about a pivot point, the gang including a gang support element, a plurality of blades rotatably coupled to the gang support element, and a roller coupled to the gang support element and in contact with the upper surface.

16. The tillage machine of claim 15, further comprising a locking structure having a handle and a main pin body, wherein the main pin body is configured to be extended in and out of the plurality of apertures.

17. The tillage machine of claim 16, wherein the gang includes a bracket coupled to the gang support element, wherein the bracket includes a main plate, wherein the locking structure is coupled to the main plate and includes a biasing element that biases the main pin body toward the adjustment rail.

18. The tillage machine of claim 15, wherein the upper surface defines a thickness of the adjustment rail, wherein the thickness is less than 1 inch.

19. The tillage machine of claim 15, wherein the adjustment rail extends along a radius of curvature that extends from the pivot point.

* * * * *